(12) United States Patent
Ederer et al.

(10) Patent No.: US 7,879,393 B2
(45) Date of Patent: Feb. 1, 2011

(54) METHOD AND DEVICE FOR APPLYING FLUIDS

(76) Inventors: Ingo Ederer, Feuerhausstraße 3, D-86669 Hausen (DE); Rainer Höchsmann, Schloss Str. 16, D-86682 Genderkingen (DE); Harald Türck, Am Nymphenbad 14, 81245 München (DE)

(*) Notice: Subject to any disclaimer, the term of this patent is extended or adjusted under 35 U.S.C. 154(b) by 119 days.

(21) Appl. No.: 10/474,301

(22) PCT Filed: Mar. 26, 2002

(86) PCT No.: PCT/DE02/01103

§ 371 (c)(1),
(2), (4) Date: Apr. 8, 2004

(87) PCT Pub. No.: WO02/083323

PCT Pub. Date: Oct. 24, 2002

(65) Prior Publication Data

US 2004/0170765 A1    Sep. 2, 2004

(30) Foreign Application Priority Data

Apr. 10, 2001 (DE) ................. 101 17 875

(51) Int. Cl.
*B05D 1/12* (2006.01)
*B05D 1/38* (2006.01)
*B05D 1/40* (2006.01)
*B05D 1/42* (2006.01)
*B28B 1/08* (2006.01)

(52) U.S. Cl. ............ 427/203; 427/560; 427/600; 427/180; 427/189; 427/356; 427/402; 427/419.2; 264/401; 264/308; 264/69; 264/113

(58) Field of Classification Search ............ 427/600
See application file for complete search history.

(56) References Cited

U.S. PATENT DOCUMENTS

| 2,640,629 A | 6/1953 | McDonald et al. |
| 2,692,142 A | 10/1954 | Hunter |
| 2,857,938 A | 10/1958 | Wahl |
| 3,616,969 A | 11/1971 | Koizumi |
| 3,616,972 A | 11/1971 | Christy |

(Continued)

FOREIGN PATENT DOCUMENTS

DE 4325573 C2 7/1993

(Continued)

OTHER PUBLICATIONS

Definition of "tip", www.thefreedictionary.com/tip, printed May 6, 2010, pp. 1-8.*

(Continued)

*Primary Examiner*—Katherine A Bareford
(74) *Attorney, Agent, or Firm*—Dobrusin & Thennisch PC (57) ABSTRACT

The invention relates to a method for applying fluids, especially particle material, on a area that is to be coated, wherein the fluid is applied on the area to be coated in front of a blade when observed from the direction of forward movement of the blade and said blade is then displaced on the applied fluid. The method is characterized in that the blade performs an oscillation similar to a rotational movement.

11 Claims, 5 Drawing Sheets

U.S. PATENT DOCUMENTS

| | | | |
|---|---|---|---|
| 3,815,527 A | 6/1974 | Dobbins | |
| 3,913,503 A | 10/1975 | Becker | |
| 4,239,715 A | 12/1980 | Pratt | |
| 4,247,508 A | 1/1981 | Housholder | |
| 4,279,949 A * | 7/1981 | Esser | 427/356 |
| 4,369,025 A | 1/1983 | von der Weid | |
| 4,575,330 A | 3/1986 | Hull | |
| 4,579,252 A | 4/1986 | Wilson | |
| 4,630,755 A | 12/1986 | Campbell | |
| 4,669,634 A | 6/1987 | Leroux | |
| 4,752,352 A | 6/1988 | Feygin | |
| 4,863,538 A | 9/1989 | Deckard | |
| 4,889,433 A | 12/1989 | Pratt | |
| 4,938,816 A | 7/1990 | Beaman et al. | |
| 4,944,817 A | 7/1990 | Bourell et al. | |
| 5,017,753 A | 5/1991 | Deckard | |
| 5,053,090 A | 10/1991 | Beaman et al. | |
| 5,076,869 A | 12/1991 | Bourell et al. | |
| 5,127,037 A | 6/1992 | Bynum | |
| 5,132,143 A | 7/1992 | Deckard | |
| 5,147,587 A | 9/1992 | Marcus et al. | |
| 5,155,324 A | 10/1992 | Deckard et al. | |
| 5,156,697 A | 10/1992 | Bourell et al. | |
| 5,182,170 A | 1/1993 | Marcus et al. | |
| 5,204,055 A | 4/1993 | Sachs et al. | |
| 5,221,539 A | 6/1993 | Pallerberg et al. | |
| 5,248,456 A | 9/1993 | Evans et al. | |
| 5,252,264 A | 10/1993 | Forderhase et al. | |
| 5,284,695 A | 2/1994 | Barlow et al. | |
| 5,296,062 A | 3/1994 | Bourell et al. | |
| 5,316,580 A | 5/1994 | Deckard | |
| 5,340,656 A | 8/1994 | Sachs et al. | |
| 5,342,919 A | 8/1994 | Dickens, Jr. et al. | |
| 5,352,405 A | 10/1994 | Beaman et al. | |
| 5,354,414 A | 10/1994 | Feygin | |
| 5,382,308 A | 1/1995 | Bourell et al. | |
| 5,387,380 A * | 2/1995 | Cima et al. | 264/69 |
| 5,431,967 A | 7/1995 | Manthiram et al. | |
| 5,433,520 A | 7/1995 | Adams | |
| 5,482,659 A | 1/1996 | Sauerhoefer | |
| 5,490,962 A | 2/1996 | Cima et al. | |
| 5,518,680 A | 5/1996 | Cima et al. | |
| 5,573,055 A | 11/1996 | Melling et al. | |
| 5,597,589 A | 1/1997 | Deckard | |
| 5,601,868 A * | 2/1997 | Gerhardt | 427/8 |
| 5,616,294 A | 4/1997 | Deckard | |
| 5,639,070 A | 6/1997 | Deckard | |
| 5,639,402 A | 6/1997 | Barlow et al. | |
| 5,647,931 A * | 7/1997 | Retallick et al. | 156/73.6 |
| 5,658,412 A | 8/1997 | Retallick et al. | |
| 5,730,925 A | 3/1998 | Mattes et al. | |
| 5,753,274 A | 5/1998 | Wilkening et al. | |
| 5,807,437 A | 9/1998 | Sachs et al. | |
| 5,851,465 A | 12/1998 | Bredt | |
| 5,902,441 A | 5/1999 | Bredt et al. | |
| 5,902,537 A | 5/1999 | Almquist et al. | |
| 5,934,343 A | 8/1999 | Gaylo et al. | |
| 5,943,235 A | 8/1999 | Earl et al. | |
| 5,965,170 A | 10/1999 | Matsuoka et al. | |
| 6,007,318 A | 12/1999 | Russell et al. | |
| 6,036,777 A | 3/2000 | Sachs | |
| 6,042,774 A | 3/2000 | Wilkening et al. | |
| 6,048,188 A | 4/2000 | Hull et al. | |
| 6,094,994 A | 8/2000 | Satake et al. | |
| 6,116,517 A | 9/2000 | Heinzl et al. | |
| 6,146,567 A | 11/2000 | Sachs et al. | |
| 6,147,138 A | 11/2000 | Hochsmann et al. | |
| 6,155,331 A | 12/2000 | Langer et al. | |
| 6,193,922 B1 | 2/2001 | Ederer | |
| 6,217,816 B1 | 4/2001 | Tang | |
| 6,258,170 B1 | 7/2001 | Smoekh et al. | |
| 6,316,060 B1 * | 11/2001 | Elvidge et al. | 427/565 |
| 6,322,728 B1 | 11/2001 | Brodkin et al. | |
| 6,375,874 B1 | 4/2002 | Russell et al. | |
| 6,401,001 B1 | 6/2002 | Jang et al. | |
| 6,403,002 B1 | 6/2002 | van der Geest | |
| 6,416,850 B1 | 7/2002 | Bredt et al. | |
| 6,423,255 B1 | 7/2002 | Hoechsmann et al. | |
| 6,436,334 B1 | 8/2002 | Hattori et al. | |
| 6,460,979 B1 | 10/2002 | Heinzl et al. | |
| 6,467,525 B2 | 10/2002 | Herreid et al. | |
| 6,500,378 B1 | 12/2002 | Smith | |
| 6,554,600 B1 | 4/2003 | Hofmann et al. | |
| 6,610,429 B2 | 8/2003 | Bredt et al. | |
| 6,733,528 B2 | 5/2004 | Abe et al. | |
| 6,764,636 B1 * | 7/2004 | Allanic et al. | 264/401 |
| 6,830,643 B1 | 12/2004 | Hayes | |
| 6,838,035 B1 | 1/2005 | Ederer et al. | |
| 7,004,222 B2 | 2/2006 | Ederer et al. | |
| 7,137,431 B2 | 11/2006 | Ederer et al. | |
| 7,204,684 B2 | 4/2007 | Ederer et al. | |
| 2001/0050031 A1 | 12/2001 | Bredt et al. | |
| 2002/0026982 A1 | 3/2002 | Bredt et al. | |
| 2004/0012112 A1 | 1/2004 | Davidson et al. | |
| 2004/0025905 A1 | 2/2004 | Ederer et al. | |
| 2004/0026418 A1 | 2/2004 | Ederer et al. | |
| 2004/0035542 A1 | 2/2004 | Ederer et al. | |
| 2004/0056378 A1 | 3/2004 | Bredt et al. | |
| 2004/0094058 A1 | 5/2004 | Kasperchik et al. | |
| 2004/0170765 A1 | 9/2004 | Ederer et al. | |
| 2005/0017394 A1 | 1/2005 | Hochsmann et al. | |
| 2005/0167872 A1 | 8/2005 | Tsubaki et al. | |
| 2006/0105102 A1 | 5/2006 | Hochsmann et al. | |
| 2006/0175346 A1 | 8/2006 | Ederer et al. | |

FOREIGN PATENT DOCUMENTS

| | | |
|---|---|---|
| DE | 4300478 C1 | 8/1994 |
| DE | 4325573 | 2/1995 |
| DE | 29506204.5 | 4/1995 |
| DE | 4400523 | 7/1995 |
| DE | 4440397 | 9/1995 |
| DE | 19530295 | 1/1997 |
| DE | 29701279 | 1/1997 |
| DE | 19511772 C2 | 9/1997 |
| DE | 19723892 | 9/1998 |
| DE | 19846478 | 4/2000 |
| DE | 19853834 | 5/2000 |
| DE | 10047614 | 4/2002 |
| DE | 10117875 | 1/2003 |
| DE | 10216013 A1 | 10/2003 |
| EP | 0538244 B1 | 10/1987 |
| EP | 0711213 B1 | 5/1995 |
| EP | 0361847 | 11/1995 |
| EP | 0 431 924 | 1/1996 |
| EP | 0739666 | 10/1996 |
| EP | 0688262 | 6/1999 |
| EP | 0734842 | 8/1999 |
| EP | 1163999 | 5/2001 |
| EP | 0968 776 | 10/2002 |
| FR | 2790418 | 9/2000 |
| WO | WO 93/25336 A1 | 12/1993 |
| WO | WO 95/18715 | 7/1995 |
| WO | WO 96/05038 | 2/1996 |
| WO | WO 00/03324 | 1/2000 |
| WO | WO 00/21736 | 4/2000 |
| WO | WO 00/51809 A1 | 9/2000 |
| WO | WO 01/26885 | 4/2001 |
| WO | WO 01/72502 A1 | 4/2001 |
| WO | WO 01/34371 | 5/2001 |
| WO | WO 01/41939 A1 | 6/2001 |
| WO | WO 01/96048 A1 | 12/2001 |
| WO | WO 02/26419 | 4/2002 |
| WO | WO 02/26420 | 4/2002 |

| | | |
|---|---|---|
| WO | WO 02/26478 | 4/2002 |
| WO | WO 02/28568 | 4/2002 |
| WO | WO 02/064353 | 8/2002 |
| WO | WO 02/064354 | 8/2002 |
| WO | WO 02/083323 | 10/2002 |
| WO | WO 03/016030 | 2/2003 |
| WO | WO 03/103932 A1 | 12/2003 |
| WO | WO 2004/112988 | 12/2004 |
| WO | WO 2005/080010 | 9/2005 |
| WO | WO 2005/113219 | 12/2005 |

OTHER PUBLICATIONS

Definition of "amplitude", www.thefreedictionary.com/amplitude, printed May 6, 2010, pp. 1-4.*
Sachs et al., "Three-Dimensional Printing: Rapid Tooling and Prototypes Directly from a CAD Model", Massachusetts Institute of Technology, pp. 143-151.
Sachs et al., "Three-Dimensional Printing: Rapid Tooling and Prototypes Directly from a CAD Model", Massachusetts Institute of Technology, pp. 131-136.
Williams, "Feasibility Study of Investment Casting Pattern Design by Means of Three Dimensional Printing", Department of Mechanical Engineering, Jun. 5, 1989, pp. 2-15.
Cima et al., "Computer-derived Microstructures by 3D Printing: Bio- and Structural Materials," SFF Symposium, Austin, TX (1994).
International Search Report, PCT/DE/00/03324, dated May 6, 2001.
International Search Report, PCT/DE01/03662, dated Jan. 3, 2002.
International Search Report, PCT/DE01/03661, dated Feb. 28, 2002.
International Search Report, PCT/DE02/01103, dated Sep. 30, 2002.
Copending National Phase Application, WO 02/26419, dated Apr. 4, 2002 with English Translation.
Copending National Phase Application, WO 02/28568, dated Apr. 11, 2002 with English Translation.
Copending National Phase Application, WO 02/26478, dated Apr. 4, 2002 with English Translation.
Copending National Phase Application, WO 02/26420, dated Apr. 4, 2002 with English Translation.
Copending National Phase Application, WO 03/086726, Oct. 17, 2005.
Copending National Phase Application, WO 03/103932, Dec. 18, 2003.
Copending National Phase Application, WO 03/097518, Jun. 24, 2005.
Copending National Phase Application, WO 04/112988, Dec. 8, 2005.
International Search Report, WO 04/110719, Jan. 11, 2005.
Marcus et al., Solid Freedom Fabrication Proceedings, Nov. 1993.
Opposition to European Patent No. 1322458 B1, Jan. 19, 2005.
Copending National Phase Application, WO 05/080010, Sep. 1, 2005.
Copending National Phase Application, WO 05/113219, Dec. 1, 2005.
Gephart, Rapid Prototyping, pp. 118-119, 1996.
Jacobs et al., 2005 SME Technical Paper, title Are QuickCast Patterns Suitable for Limited Production, 2005.
Feature Article—Rapid Tooling—Cast Resin and Sprayed Metal Tooling by Joel Segal, Apr. 2000.
Copending U.S. Appl. No. 11/767,778, filed Jun. 25, 2007.
Opposition of Patent No. EP1377389.
Opposition of Patent No. DE10047614.
Marcus, et al., Solid Freeform Fabrication Proceedings, Sep. 1995, p. 130-33.

* cited by examiner

METHOD AND DEVICE FOR APPLYING FLUIDS

CLAIM OF BENEFIT OF FILING DATE

The present application claims the benefit of the filing date of PCT Application Serial No. PCT/DE02/01103, (filed Mar. 26, 2002) (published as WO 02/083323) and DE 101 178175.1 (filed Apr. 10, 2001), the contents of which are hereby incorporated by reference in their entirety.

FIELD OF THE INVENTION

This invention concerns a procedure and a device for applying fluids in accordance with the general definitions of the independent claims. The invention also concerns the use of such a device.

BACKGROUND OF THE INVENTION

In many areas of technology, there is a need to apply fluids—especially those comprising particle material—in thin layers on to a carrier. In many such cases, it is also necessary for the applied layers to have the smoothest possible surface.

For example, a smooth application of particle material to be bonded plays an important role in rapid prototyping procedures.

A rapid prototyping procedure for creating casting patterns is known from DE 198 53 834.0, for instance. In this case, untreated particle material like quartz sand is applied in a thin layer to an assembly platform. A spraying device is then used to finely distribute bonding agent all over the particle material. After that, a hardener is applied over selected sections in order to strengthen corresponding areas of the particle material. This process is repeated several times to individually mould a body from the bonded particle material. This body is initially embedded in the surrounding, unbound particle material, from where it can be subsequently removed following completion of the assembly phase.

If this type of rapid prototyping procedure involves the use of quartz sand as the particle material and furan resin as the bonding agent, for example, a hardener comprising sulphuric acid can be used to produce a mould comprising a common substance familiar to experts.

Difficulties arising during these well-known procedures are often posed by the smoothest and thinnest possible application of particle material; this influences the layer thickness, i.e. the smallest unit and therefore also the accuracy at which the mould can be produced.

One procedure of applying a layer of powder on a surface is known from EP 0 538 244 B1; in this case, the surface is fed with powder and then travelled over by a roller which rotates slowly in a direction opposing its linear travel over the surface. The powder makes contact with the roller rotating in the opposite direction and is thus distributed in a layer on the surface as the roller travels over it. This coating technique prevents any significant shear stress from being exerted on previously applied layers and the mould from being damaged as a result.

U.S. Pat. No. 5,902,537 also describes the application of particle material by means of a roller rotating in a direction opposing its linear propagation.

However, if such coating techniques involve the use of powders with a strong tendency to form agglomerates, for instance, particle material possessing a very fine grain or a content of binder, it proves very difficult to apply the material in a thin and smooth layer. The particle material tends to form lumps which stick to the roller, thus preventing achievement of a smooth surface.

Given the use of particle material—especially with a tendency to form lumps—a counter-rotating roller also has the disadvantage of heavily soiling all components which make contact with the particle material, thus entailing more frequent maintenance and proving more expensive.

Similarly, the coating technique described in U.S. Pat. No. 5,730,925 is not capable of achieving smooth surfaces with powders tending to agglomerate, because the powders also form lumps and result in rough surfaces in this case.

U.S. Pat. No. 6,036,777 describes a device for applying powder to a surface. A distributor moving across the surface to be coated applies layers of powder on it. The distributor operates in conjunction with a vibrating mechanism for compacting the powder.

This vibrating mechanism also proves disadvantageous, the vertical exertion of force on the particle layer producing an undesirable compression effect which causes uneven compaction of the required mould or model. This results in uncontrolled displacements in the mould during its fabrication on the powder bed, thus impairing the production accuracy.

Under certain circumstances, particle material with a strong tendency toward agglomeration might even make it completely impossible to produce smooth layers.

However, it is precisely a generation of smooth powder layers which proves extremely important in many applications. In the case of the rapid prototyping procedure described in some detail earlier, it is essential to apply particle layers as thinly and evenly as possible in order to maximize the accuracy of component production. Layer thickness constitutes the smallest possible increment during step-by-step component build-up. The thicker and rougher the layers, the less accurate the shape of the final cast.

SUMMARY OF THE INVENTION

Accordingly, the purpose of this invention is to provide a device and procedure making it possible to distribute fluid in the most homogeneous manner on surfaces needing to be coated.

The invention solves this problem by providing a technique of applying fluids of the previously mentioned type by means of a blade vibrating in a circular motion.

In this type of technique, it turns out that the layer—comprising particle material, for instance—applied to the surface to be coated is fluidized by the blade's vibrating, rotary motion. This not only permits an extremely smooth and even application of particle material with a strong tendency toward agglomeration, but also makes it possible to influence fluid compression through the vibrations.

If the procedure forming part of the invention is embodied preferably so as to apply excess fluid to the surface to be coated, the blade's perpetual, rotary oscillation during its forward movement distributes the excess fluid/particle material evenly by forming it into a roll leading the blade's travel. This fills any cavities between small particle lumps and breaks up large lumps of particle material through the roll's motion. The particle material inside the roll is homogenized. A small proportion of the particle material leading the blade is drawn in through a gap below the blade, where it is compressed and applied as an even layer.

Application of the fluid or particle material to the area in front of the vibrating blade as it travels forward can take place in any manner familiar to experts. For instance, it is thinkable to feed the substance from a reservoir via a conveyor belt.

In particular, it is possible to realize the feed as described in DE 195 30 295, whose disclosure is referred in full measure.

It is also possible for a reservoir travelling with a recoater and containing particle material to continuously apply a certain amount of this material to the surface to be coated in front of the recoater and the moving blade. In this process, the reservoir's contents can be controlled via another, stationary vessel or supply source.

A vessel open at the bottom is included to maximize the precision of dosing particle material—which might be moist under certain circumstances—on a surface. The sand is compressed in a nearby vibrating channel to form an angle of repose. On actuation of the vibrating channel, the sand flows continuously out of the vessel.

A defined dosage of particle material could also be achieved with the help of a corrugated conveyor belt which seals off the reservoir at its open bottom and which—when actuated—spreads the sand lying in its recesses on the surface to be coated. This could be aided, for example, by a shaking motion.

For the procedure forming part of this invention, it proves advantageous if the blade rotates about an axis positioned above the surface to be coated, as viewed in the direction of fluid propagation.

The procedure forming part of this invention is able to achieve especially favourable results if the circular vibrations are executed in an angular range between 0.1 and 5°.

Also especially suitable for implementing the procedure forming part of the invention is a device for applying fluids—particularly those comprising particle material—on surfaces to be coated; this device consists of a blade with a leading dosage unit which applies fluid to the surface in front of the blade which then passes over the applied fluid. This blade is mounted so as to be able to vibrate in a circular motion.

In a preferred embodiment of this invention, the blade should be positioned so as to rotate about an axis positioned above the surface to be coated, as viewed in the direction of propagation of the fluid/particle material.

Furthermore, it proves advantageous to mount the blade such that it oscillates in an angular range between 0.1 and 5°.

If the blade extends over the entire width or length of the surface to be coated, the time taken by the layering procedure is minimized. End-to-end layering performed simultaneously in this manner also results in a smoother coat.

If, in a preferred embodiment of this invention, the blade is essentially aligned orthogonally with respect to the surface to be coated, the axis of rotation can be situated as far away as possible from this surface, thus maximizing the angular adjustment accuracy.

If the blade is aligned at an angle to the orthogonal axis of the surface to be coated, layer properties can be improved further through the use of certain fluids.

The device can be designed so as to drive the blade by means of at least one fast electric motor whose eccentric causes the blade to vibrate.

The blade should be shaped so as to allow the formation of a leading, intermediate reservoir of excess fluid in the direction of the blade's travel during operation of the device; this reservoir should preferably have the form of a roll. If the blade is also shaped to provide a sufficiently large inlet for particle material while moving, this allows a reliable and continuous intake of material.

Very favourable results are also obtained if the blade possesses rounded edges, the particle material inlet then being described by the radius defining the edge of the vibrating blade.

If, in another preferred embodiment, the vibrating blade consists of two parts—a moulded blade body and a fixture—it is possible to unscrew and replace the blade body in the event of damage due to wear, for instance.

As already mentioned on several occasions, the device according to the invention has proven especially suitable for applying particle material containing binder.

In this context, the device is particularly suitable for procedures involving a production of casting patterns.

Other advantageous aspects of this invention are indicated in the sub-claims and the general description. A more detailed explanation of the invention is provided with the help of the following, preferred sample embodiments with references to the drawing.

BRIEF DESCRIPTION OF THE DRAWINGS

FIGS. 2a) and b) The geometry of a vibrating blade according to a first embodiment, perpendicular and inclined with respect to the surface to be coated;

FIGS. 4a) and b) An additional vibrating blade with an improved geometry compared with the vibrating blade in FIG. 2, perpendicular and inclined with respect to the surface to be coated;

DETAILED DESCRIPTION OF THE INVENTION

The procedure and device forming part of the invention are exemplified in a rapid prototyping procedure described in the following and involving a layer-by-layer production of casting patterns using particle material, bonding agent and hardener.

In particular, the employed mixture of particle material and bonding agent is assumed to exhibit a strong tendency to form lumps, as is usually the case in practice.

However, the use of such a particle material proves advantageous by eliminating the need for layering the material with binder—a step normally required by the rapid prototyping procedure—and thus making the coating technique faster and more cost-effective.

Use of the procedure and device forming part of this invention has proven especially beneficial in the case of particle materials possessing a tendency to agglomerate.

Particle materials with a small/medium grain size of less than 20 μm and wax powder also exhibit a strong tendency to agglomerate.

Figure 1:
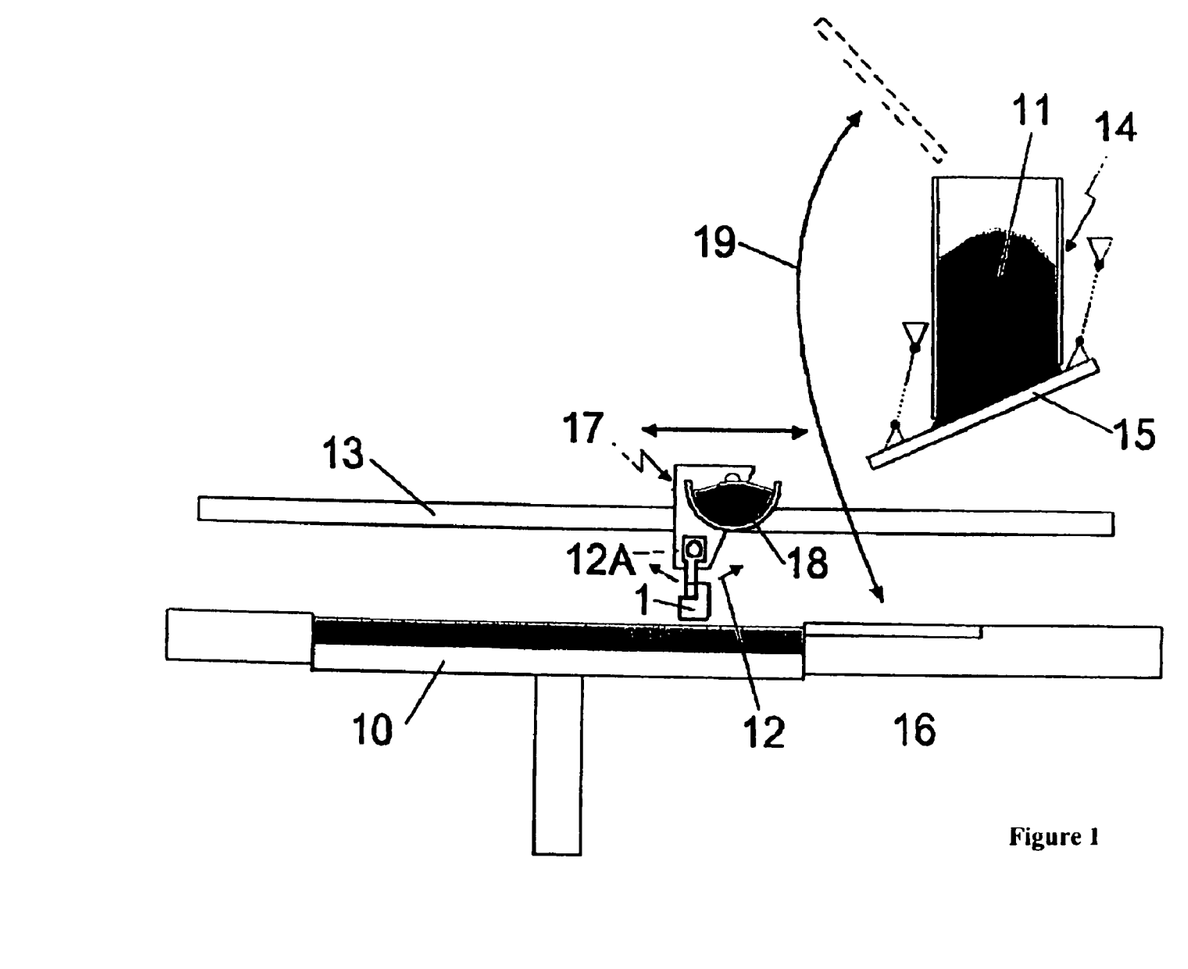
FIG. 1 A device for applying particle material on a surface to be coated.

In a component moulding technique such as the one described in FIG. 1 and involving a casting pattern, an assembly platform 10 serving as a base for configuring the mould is lowered by an interval corresponding to one layer thickness of the particle material 11. After that, the particle material 11 comprising quartz sand, for instance, and mixed in a preferred embodiment with 2% binder (such as Albertus 0401 or Resifix by Huttenes) is applied in the specified layer thickness to the assembly platform 10. This is followed by a selective application of hardener to areas requiring hardening. This can be done, for example, by means of a drop-on-demand dispenser operating similar to an ink-jet printer. These application steps are repeated to obtain the finished component, embedded in loose particle material 11.

According to a preferred embodiment, a plastic blade 1 executing a rotary motion 12 about an axis 12A is positioned above the assembly platform. The rotary motion 12 of this blade 1 is supplied by a fast electric motor whose eccentric causes the blade to vibrate.

The employed motor, for example, has a rated speed of 3000 rpm at 12 V, while the eccentric has an amplitude of 0.54 mm which results in an amplitude of 0.85 mm for the blade tip in the example described. A speed of 4050 rpm was measured at 15 V. This value corresponds to 67.5 Hz. Depending on the width of the blade 1, it might be necessary to install several drive units.

The travel of the vibrating blade (1) over the surface to be coated—assembly platform 10 in this case—is regulated by laterally installed guides 13. The drive power is supplied preferably by at least one motor with the following linkage, for instance: a cog belt routed via two idlers in parallel with the guide rail and fastened to the vibrating blade's fixture, one of the idlers being powered.

The volumetric tolerance of the coating system or recoater forming part of the invention makes it possible to deposit a substantial quantity of particle material 11 in front of the vibrating blade 1 at the beginning of the coating process, this quantity proving sufficient for the entire assembly platform 10. In accordance with the represented, preferred embodiment, this is achieved through the use of a stationary vessel 14 which is emptied via a vibrating channel 15. The vessel 14 accordingly has an open bottom facing the assembly platform 10, the particle material 11 in the vessel 14 being compacted via the vibrating channel 15 located close to the outlet as well as the angle of repose forming in this process. On actuation of the vibrating channel 15, the quartz sand 11 emerges continuously from the vessel 14.

Experiments have shown that the procedure forming part of the invention benefits from a relatively high dosage of excess particle material 11 which ensures a sufficient availability of this material even at the end of the assembly platform. The fed quantity should exceed the required quantity preferably by at least 20%, excess proportions of up 100% proving advantageous in some cases. The excess quantity of particle material 11 is ultimately pushed by the vibrating blade 1 into a linear shaft 16 located at the rear of the assembly platform 10.

To prevent a depletion of unused particle material 11 through excess dosage, the material is fed back to the reservoir 14. For this purpose, the coating element 17 is furnished with an intermediate vessel 18 for storing the layer volume and excess volume of the particle material 11. This intermediate vessel is filled from the reservoir 14 via the vibrating channel 15, moves rapidly over the specially lowered assembly platform 10 to its other end, deposits its contents in front of the vibrating blade 1, waits for the assembly platform to be returned to its correct height, and then commences coating while proceeding toward the reservoir 14. Once there, excess particle material 11 is returned to the reservoir 14 by a lifting unit. This process is indicated by the arrow 19.

Figure 2:
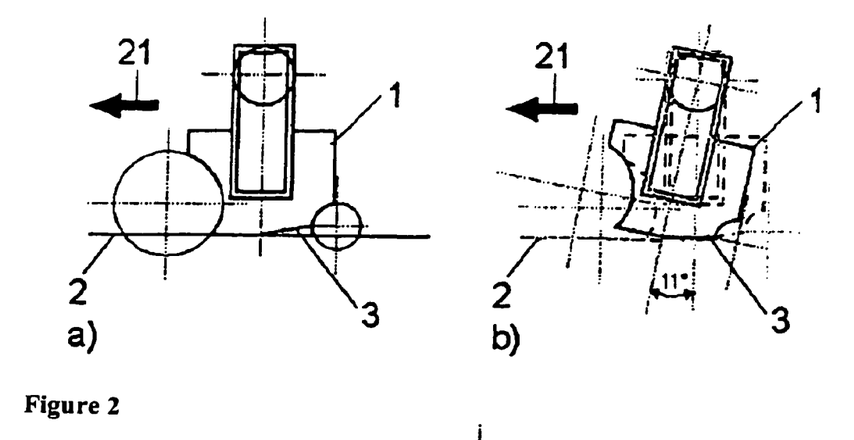

FIG. 2 shows a vibrating blade 1 in an initial embodiment, positioned perpendicularly FIG. 2*a*) and at an angle FIG. 2*b*) with respect to the surface to be coated 2. The forward motion of the vibrating blade 1 is indicated by the arrow 21.

As shown in particular by FIG. 2*b*), the geometry of the vibrating blade 1 represented in FIG. 2 can result in a roughening of the previously produced, essentially smooth layer during reversal of the edge 3.

Figure 3:
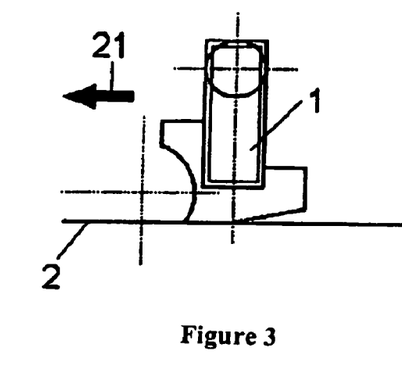
FIG. 3 An additional vibrating blade with an improved geometry compared with the vibrating blade in FIG. 2.

FIG. 3 shows a vibrating blade 1 with an improved geometry compared with FIG. 2; FIGS. 4*a*) and *b*) show yet another vibrating blade 1 with an improved geometry compared with FIG. 2, positioned perpendicularly (FIG. 4*a*) and at an angle (FIG. 4*b*).

Figure 4:
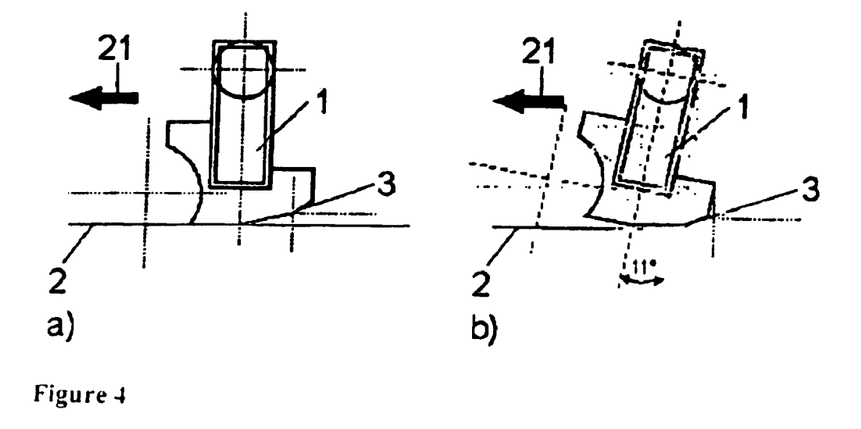

The blade 1 in FIG. 4 differs from the one in FIG. 2 by virtue of the fact that its edge 3 is slanted to allow particle material to be drawn in below the blade 1 even during reversal. This makes it possible to achieve smooth layers on the surface to be coated even during reversal of the blade 1.

Especially favourable results are achieved if the speed of blade 1 is set to a value of up to 70 mm/s, preferably 60 mm/s. At excessively high speeds, quality of the surface coating can drop again.

A blade speed corresponding to 60 Hz and 50 mm/s proves particularly advantageous.

Extremely smooth layers entail a small, relative, reverse movement of the blade 1, short of causing the blade to re-enter the surface area just coated.

This type of application does not produce any shear fissures in the material coating which otherwise always occur during layering by means of a counter-rotating roller.

Surprisingly, an excess of particle material 11 in front of the blade 1 turns out to provide favourable results. Even extremely large accumulations of particles in front of the blade 1 can be transported easily over the surface to be coated 2.

Figure 5:
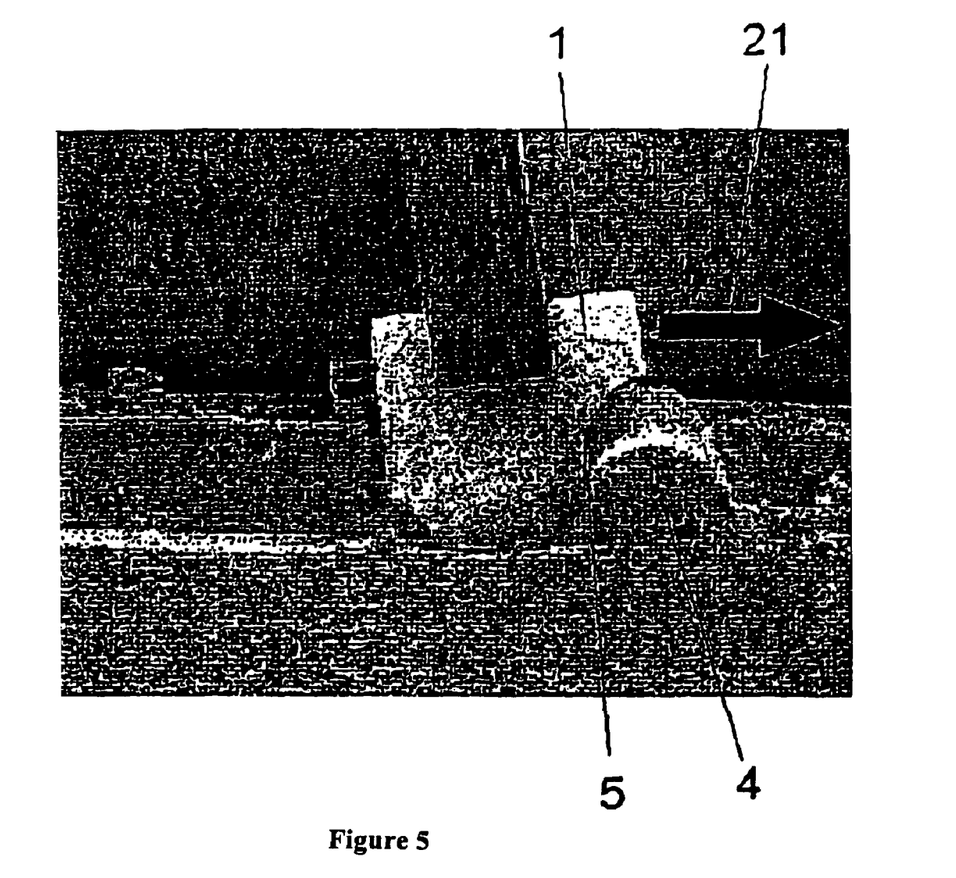
FIG. 5 Formation of a roll in front of the vibrating blade.

FIG. 5 shows roll formation 4 in front of the vibrating blade 1 whose direction of forward motion is indicated by the arrow 21.

Once the particle material 11 which has accumulated in front of the blade 1 no longer fits on the roll 4 formed in a curvature 5 of the blade 1, it is simply transported in chunks above the roll 4. As these chunks do not make any contact with the underlying layer, nor do they generate any shearing forces which could damage the newly created layers.

Even substantial soiling such as hard lumps of sand and broken bits of crust are thus easily transported together with the excess particle material to the end of the assembly area and pushed into the overflow line.

Figure 6:
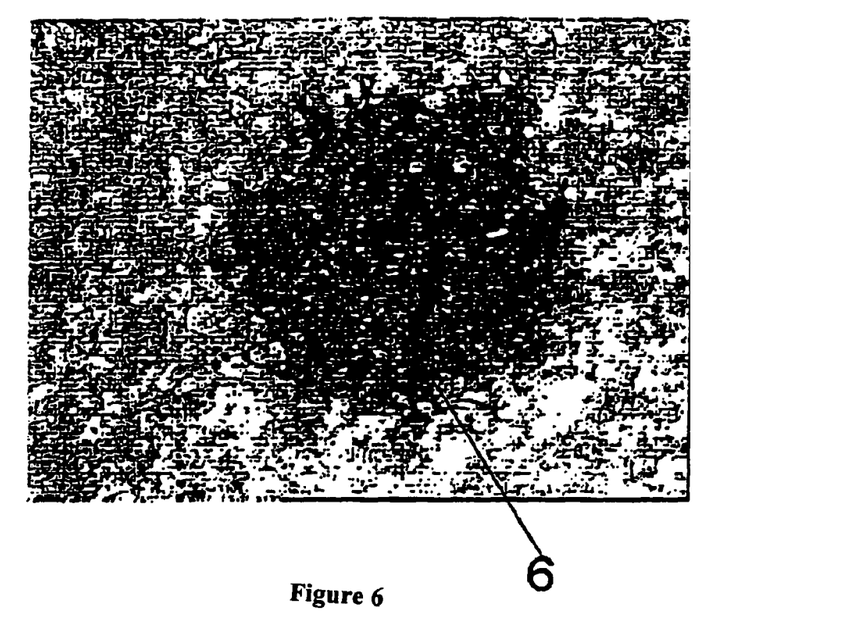
FIG. 6 Microscopic enlargement of the produced layer.

FIG. 6 shows a microscopic enlargement of a layer produced with particle material 11 containing binder. A hardening drop 6 with a diameter of roughly 4.5 mm has been applied to the layer. As opposed to dry sand, whose grains are drawn together by the capillary force of the liquid to form a type of wall on the outside of the moist area, the layer here remains completely even.

Figure 7:
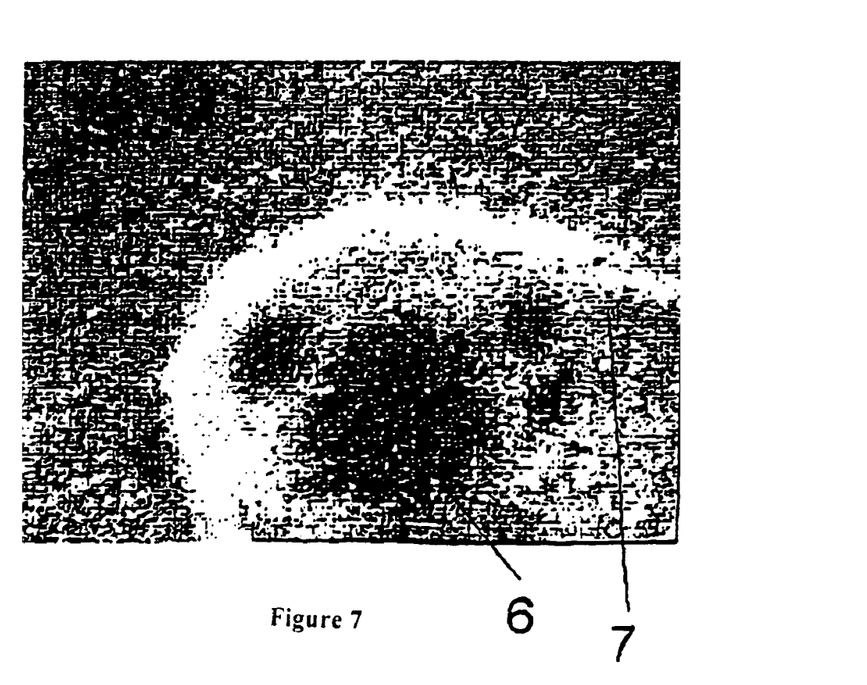
FIG. 7 Microscopic enlargement of the produced layer, flattened in parts.

FIG. 7 shows that flattening does not necessarily improve the produced layers. The round indentation 7 in the lower, right-hand corner of the picture was produced by means of a spatula tip. However, it turns out that the action of a hardening drop 6 does not change notably if the drop is applied to this more densely compressed surface. A lower tendency to trickle at the edge of the drop 6 cannot be observed.

Figure 8:
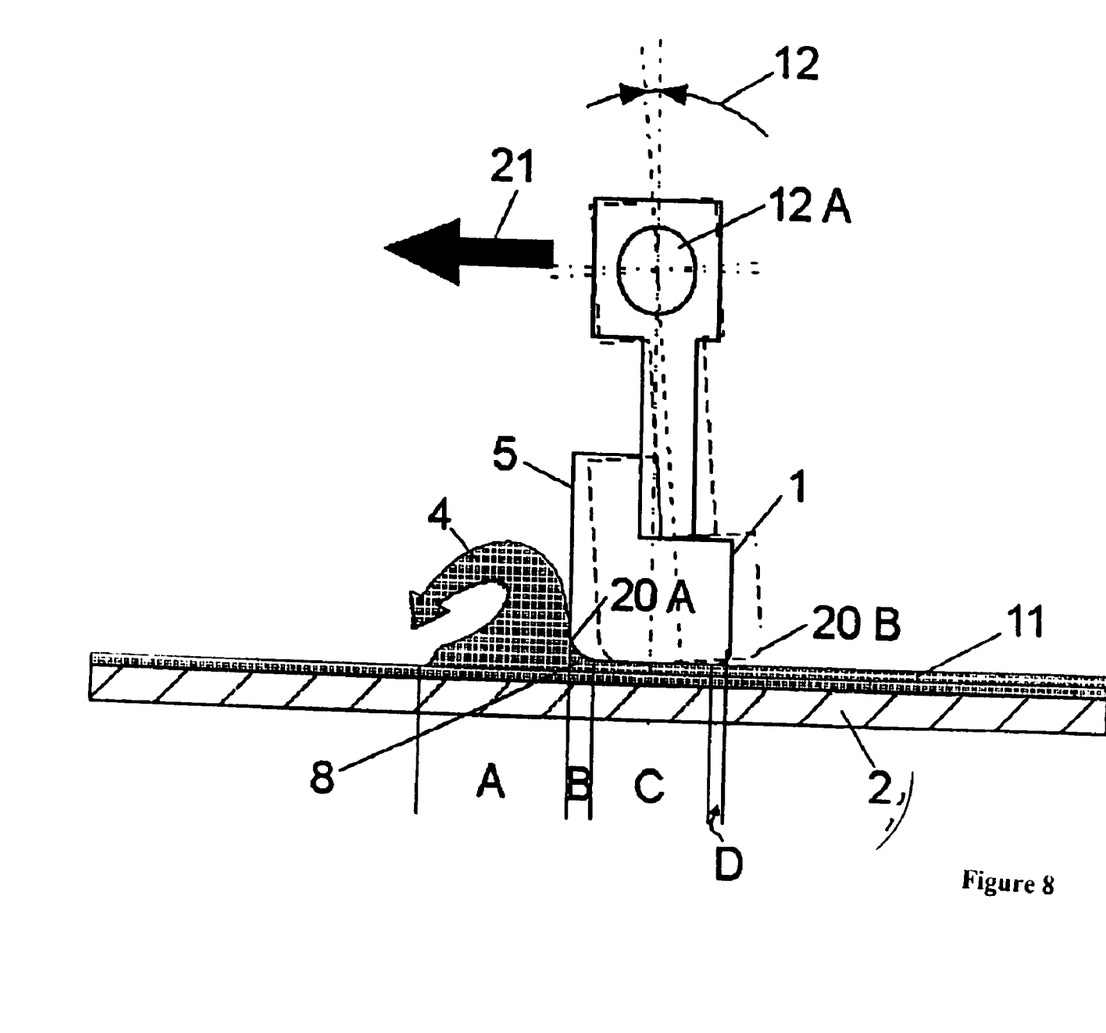
FIG. 8 Action of a vibrating blade as defined by the invention.

FIG. 8 provides a schematic representation of the action of the vibrating blade 1. This edges of this particular blade are essentially aligned vertically with respect to each other, the edges facing the surface to be coated 2 rounded by radii of 20A and 20B. Radius 20A describing the front of the blade 1 as viewed in its direction of forward motion is equal to 3 mm in the preferred embodiment represented here.

A roll 4 comprising excess particle material 11 is formed at the front 5 of the vibrating blade 1 and extends along its entire width. The continuous rolling motion homogenizes the material making up the roll 4. Accordingly, the device forming part of the invention is able to make excellent use of an excess dosage of particle material. The excess quantity leads to the formation of a roll 4. A failure of this roll to develop fully during the procedure forming part of this invention can result in flaws in the particle layer on the surface to be coated 2.

A small proportion of the particle material 11 from roll 4 is drawn in through the gap formed by radius 20A below the blade 1, where it is compressed and applied evenly to the surface to be coated 2. The geometry of the vibrating blade 1 should provide a sufficiently large inlet for the particle material 11 to ensure a reliable and continuous intake of material through this gap and prevent an impermissibly high compression of the fluid to be applied.

In FIG. 8, A designates the homogenization zone, B the compression zone, C the smoothing zone and D the compression zone on the return stroke. To avoid excessively high compression, the edge of the vibrating blade 1 facing its forward direction of travel 21 is also adequately rounded by a small radius 20B.

If required during operation, it should also be possible to additionally smoothen the applied layer of particle material 11 during reversal of the blade 1 in the direction opposing the arrow 12. For this reason, the rear edge has also been designed to permit material intake, even if only to a minor extent.

In general, the transitions between individual edges of the vibrating blade 1 should be well-rounded in order to achieve favourable results. This can be accomplished, for instance, by slightly chamfering the edges or furnishing them with curvatures as described previously.

In addition, conditions in the compression zone B can be adjusted easily and quickly by changing the inclination of the blade 1. This would also make it possible to operate the blade 1 without any compression, potentially advantageous during coating with dry sand.

Best results are achieved if the blade 1 oscillates about its neutral position, defined here as the vertical alignment with respect to the surface to be coated.

The procedure forming part of this invention also permits an easy application of sand mixed with binder in a layer thickness of just 0.3 mm.

Indeed, layers less than 0.2 mm thick are achievable in some cases, even in the presence of relatively coarse material grain. This grain is either integrated into the pores of the layer last applied, given a compatible size, or prevented entirely from passing through the gap below the blade, instead being pushed ahead on the roll situated before the blade.

The packing density of the layer produced by this invention is relatively low, thus resulting in a relatively high porosity which, however, is nevertheless considerably lower than that obtained with dry sand applied by means of a slotted coating device.

The invention claimed is:

1. A process for applying a particle material to a assembly platform for the creation of a three dimensional rapid prototype, comprising the steps of:
   a. applying the particle material to the assembly platform, for the creation of a three dimensional rapid prototype by a layer by layer deposition method, in advance of a moving blade that is mounted on an end of an arm;
   b. moving the blade, the blade including:
      1) a front edge and
      2) a rear edge essentially aligned vertically with respect to the front edge, the edges facing a surface to be coated rounded by radii,
   wherein the moving blade creates a zone that includes:
      1) a homogenization zone in front of the blade,
      2) a compression zone between the front radius of the blade and the assembly platform, and
      3) a smoothing zone between the front and rear radii of the blade and the assembly platform;
   c. vibrating the blade in an oscillating rotary motion about an axis in which the blade is rotatably mounted,
   wherein the vibration of the blade causing the particles to be fluidized and creating a roll of the particles in front of the blade, further wherein a proportion of the particle material is drawn through the compression zone during the movement over the assembly platform and during reversal of the blade providing an even layer of particle material on the assembly platform;
   d. passing the blade over the assembly platform;
   e. lowering the assembly platform; and
   f. repeating steps a-e until the three dimensional rapid prototype is complete.

2. A process according to claim 1, wherein particle material is sand that is applied in excess measure to the assembly platform to be coated.

3. A process according to claim 2, wherein the rotary motion of the blade includes motion generally in the same direction as the blade passes over the assembly platform.

4. A process according to claim 1 wherein the rotary motion of the blade includes motion generally in the same direction as the blade passes over the assembly platform.

5. The process of claim 1, wherein the process includes the step of applying a hardener to selective area on each layer thickness before applying a next layer of the particle material to the assembly platform.

6. The process of claim 1, wherein the particle material includes a bonding agent.

7. A process according to claim 1, wherein the moving blade is essentially aligned orthogonally with respect to the assembly to be coated and is adapted to move linearly with respect to the platform.

8. A process according to claim 7, wherein the arm and the blade are driven by at least one electric motor whose eccentricity causes the moving blade to vibrate.

9. A process according to claim 1, wherein the particle material consists essentially of sand.

10. A process for applying a particle material to an assembly platform for the creation of a three dimensional rapid prototype, comprising the steps of:
   a. applying the particle material to the assembly platform, for the creation of a three dimensional rapid prototype by a layer by layer deposition method, in advance of a moving blade;
   b. providing a moving blade mounted on an arm, the moving blade including:
      1) a front edge and
      2) a rear edge essentially aligned vertically with respect to the front edge, the edges facing a surface to be coated rounded by radii,
   wherein the moving blade creates a zone that includes:
      1) a homogenization zone in front of the blade,
      2) a compression zone between the front radius of the blade and the assembly platform, and
      3) a smoothing zone between the front and rear radii of the blade and the assembly platform;
   c. advancing the moving blade across the assembly platform;
   d. swinging the blade forward, in a rotary motion, about an axis in which the blade is rotatably mounted,
   wherein the swinging of the blade causes the particles to be fluidized;
   e. creating a roll of the particles in the homogenization zone by the rotary motion of the blade and a forward movement of the blade across the assembly platform;

f. swinging the blade backwards in a rotary motion about the axis;
g. drawing a proportion of the particle material from the roll through a gap formed between at least one of the radii of the blade and a surface of the assembly platform to be coated;
h. compressing and applying the particle material to the surface of the assembly platform to be coated in the compression zone;
i. smoothing the particles in the smoothing zone during both the forward and backwards swinging steps providing an even layer of particle material on the assembly platform;
j. lowering the assembly platform; and
k. repeating steps a-j until the three dimensional rapid prototype is complete.

11. The process according to claim 10, wherein the three dimensional rapid prototype is a casting pattern.

* * * * *